(12) United States Patent
Joseph et al.

(10) Patent No.: US 12,269,730 B2
(45) Date of Patent: Apr. 8, 2025

(54) CANNABIS CONCENTRATE DISPENSING SYSTEM AND METHOD

(71) Applicant: DETROIT DISPENSING SOLUTIONS LLC, Bloomfield Hills, MI (US)

(72) Inventors: Christopher Anthony Joseph, Bloomfield Hills, MI (US); Jack Forbes Burnie, Berkley, MI (US)

(73) Assignee: DETROIT DISPENSING SOLUTIONS LLC, Bloomfield Hills, MI (US)

( * ) Notice: Subject to any disclaimer, the term of this patent is extended or adjusted under 35 U.S.C. 154(b) by 192 days.

(21) Appl. No.: 17/987,459

(22) Filed: Nov. 15, 2022

(65) Prior Publication Data

US 2023/0119346 A1   Apr. 20, 2023

Related U.S. Application Data

(63) Continuation-in-part of application No. 17/502,739, filed on Oct. 15, 2021, now Pat. No. 11,858,672.

(51) Int. Cl.
| | | |
|---|---|---|
| *B67D 7/06* | (2010.01) | |
| *B67D 7/18* | (2010.01) | |

(52) U.S. Cl.
CPC ............. *B67D 7/061* (2013.01); *B67D 7/18* (2013.01)

(58) Field of Classification Search
CPC .... B65B 3/26; B65B 3/28; B65B 3/30; B65B 3/305; B65B 3/32; B65B 3/323; B65B 3/34; B65B 3/36; B65B 29/00; B67D 7/061; B67D 7/18; G01F 11/04
See application file for complete search history.

(56) References Cited

U.S. PATENT DOCUMENTS

| | | | |
|---|---|---|---|
| 4,871,001 A | 10/1989 | Nobuta et al. | |
| 5,168,905 A * | 12/1992 | Phallen | B65B 3/36 |
| | | | 141/237 |
| 9,283,324 B2 | 3/2016 | Lev et al. | |
| 10,058,124 B2 | 8/2018 | Monsees et al. | |
| 10,279,934 B2 | 5/2019 | Christensen et al. | |
| 10,327,479 B2 | 6/2019 | Popplewell et al. | |

(Continued)

FOREIGN PATENT DOCUMENTS

| | | |
|---|---|---|
| EP | 3046838 | 7/2016 |
| WO | 2022183279 | 9/2022 |

*Primary Examiner* — Anna K Kinsaul
*Assistant Examiner* — Himchan Song
(74) *Attorney, Agent, or Firm* — Brooks Kushman P.C.

(57) ABSTRACT

A method and system for dispensing metered shots of cannabis-containing or hemp-containing concentrate into a receiving vessel. The method comprises the steps of (a) providing a control module that includes a touch screen; (b) communicating the control module with an endless piston pump or progressive cavity pump; (c) deploying a disposable plastic tube and plunger to dispense bulk concentrate into the pump; (d) positioning an empty receiving vessel into a position in relation to the dispenser using a conveyor, or a turntable, or by manually placing the receiving vessel into position; (e) dispensing a metered shot of the concentrate into the empty receiving vessel to prepare a filled vessel; and (f) re-positioning the filled vessel in registration with the conveyor or turntable so that the dispenser becomes engaged with a subsequent empty receiving vessel.

3 Claims, 6 Drawing Sheets

(56) References Cited

U.S. PATENT DOCUMENTS

| | | |
|---|---|---|
| 10,440,989 B2 | 10/2019 | Gardella et al. |
| 10,561,172 B2 | 2/2020 | Armoush et al. |
| 10,583,949 B1 * | 3/2020 | Ellis .......................... B65B 3/12 |
| 10,865,001 B2 | 12/2020 | Atkins et al. |
| 11,083,857 B2 | 8/2021 | Ampolini et al. |
| 11,440,686 B1 * | 9/2022 | Matye ................... B65B 57/145 |
| 2018/0080952 A1 * | 3/2018 | Lehtonen ................. B65B 3/26 |
| 2019/0014824 A1 | 1/2019 | Yazbeck et al. |
| 2019/0183181 A1 | 6/2019 | Guenther, Jr. et al. |
| 2020/0000143 A1 | 1/2020 | Anderson et al. |
| 2021/0267265 A1 * | 9/2021 | Partansky ............ B67D 3/0022 |
| 2022/0084648 A1 * | 3/2022 | Cabigon ................. B67D 7/08 |

* cited by examiner

CANNABIS CONCENTRATE DISPENSING SYSTEM AND METHOD

CROSS-REFERENCE TO RELATED APPLICATIONS

This application claims priority to and is a continuation-in-part of U.S. Ser. No. 17/502,739, filed on Oct. 15, 2021, now U.S. Pat. No. 11,858,672 issued Jan. 2, 2024, which is incorporated by reference.

TECHNICAL FIELD

The present disclosure generally relates to a cannabis concentrate dispensing system and method. In at least one embodiment, this disclosure describes a system for transferring bulk material from a disposable container in metered amounts to jars.

BACKGROUND

Cannabis concentrate in bulk form may be in a solid, semi-solid, or viscous state at room temperature. Applying heat to the starting material may enhance fluidity, but degrade the material's quality. The starting material may differ in density from batch to batch.

The material is packaged into smaller jars in measured amounts. The varying characteristics of the material make it difficult to transfer the material into jars using conventional methods.

Thus, the cannabis manufacturer seeks a reliable and accurate system in which the cannabis concentrate is delivered from a bulk state to a jar in metered amounts, ideally without the application of heat.

Further, it would be desirable for the starting material to be placed into a container in bulk form that can be easily and quickly changed after the batch has been completely dispensed.

SUMMARY

A cannabis concentrate dispensing system is disclosed. In an exemplary embodiment, the system has four sub-assemblies: a progressive cavity pump sub-assembly, a bulk material feed container sub-assembly, a system control sub-assembly, and a stand sub-assembly with a linear positioning slider.

In one embodiment, the stand with a linear positioning slider sub-assembly ("stand") has an attached progressive cavity pump ("pump") sub-assembly to allow the pump to be re-positioned.

In an alternative embodiment, the pump is attached to a positioning robot. The robot precisely positions the pump sub-assembly over a receiving container ("jar") and dispenses cannabis concentrate in metered amounts into the jar.

In another embodiment, the pump is positioned over a conveyor belt. The conveyor belt moves jars with respect to the pump to receive a metered shot.

The pump has a servo motor, a material inlet port, a material outlet port, an eccentric rotor, a stator, and a gear-reduction sub-assembly. One suitable pump is a progressive cavity pump, which works off a progressive cavity principle, otherwise known as an endless piston. As the servo motor rotates the eccentric rotor inside the stator, a precise amount of material is dispensed from the material inlet port to the material outlet port, regardless of the viscosity or density of the material.

The bulk material feed container ("tube") sub-assembly is in direct fluid communication with the pump. The tube has a disposable, preferably 20-ounce, plastic tube and a plunger that is situated in an aluminum housing. The housing seals around the tube end, allowing gas pressure to apply force directly onto the plunger. With this applied pressure, the plunger pushes the bulk material from the tube into the material inlet port of the pump.

Once the tube has been completely emptied of bulk material, a new tube with another batch of material can be placed into the aluminum housing.

To monitor and control the system, the system control sub-assembly ("control") uses a human-machine interface touchscreen ("HMI") and programmable logic controller ("PLC"). The control processes parameters associated with the pump, including determining the amount of material dispensed, and the rate at which the material is dispensed. The pump is adapted to pressurize the bulk material feed container sub-assembly with gas.

To actuate the dispensing process, three methods can be employed, separately or in combination. The first method is to use the touchscreen by pressing a digital button located on the screen. The second method is to use a foot pedal to actuate the dispensing process. The third method is to use a thumb-switch to actuate the dispensing process.

In the embodiment in which a robot or a conveyor positions the pump, the robot uses electrical signals and sensors to determine when to actuate the dispensing process.

To determine the correct amount of material to dispense, the control is adapted to calibrate the amount of material dispensed. In use, the pump dispenses an amount of material. That material is then weighed, and the weight of the dispensed material is entered into the control. The control can then determine the density of the material and change its calibration to dispense the correct, desired amount of material.

DETAILED DESCRIPTION

As required, detailed embodiments are disclosed herein; however, it is to be understood that the disclosed embodiments are merely exemplary. They may be embodied in various and alternative forms. The Figures are not necessarily to scale. Some features may be exaggerated or minimized to show details of particular components. Therefore, the specific structural and functional details disclosed herein are not to be interpreted as limiting, but merely as a representative basis for teaching one skilled in the art to variously make and use the disclosed system.

Most embodiments of this disclosure relate to a cannabis concentrate dispensing system. First, the overall method steps will be described, before turning to a description of various components.

Method Steps

Several aspects of this disclosure relate to a method for dispensing metered shots of semi-solid cannabis-containing or hemp-containing concentrate ("concentrate") into a receiving vessel ("jar"). In one variant of alternative method steps, several steps include the following:

A control module is provided that preferably has a touch screen. The control module is adapted to execute several operations. They include receiving, storing, and processing data that characterize the semi-solid cannabis-containing or hemp-containing concentrate. The data are selected from the group consisting of, for example, fluid viscosity, density, and a desired mass of the shot to be dispensed.

The control module controls process parameters based on the data. Those process parameters are selected from the group consisting of factors that influence, preferably, a dispenser such as an endless piston pump, also known as a progressive cavity pump. The control module lies in communication with the dispenser.

To feed the pump with bulk materials, a disposable plastic tube and plunger are provided.

Next, an empty receiving vessel is moved into a position in relation to the dispenser. Movement is provided by a conveyor, a turntable, or by manually placing the receiving vessel into position.

A metered shot is then dispensed into the empty receiving vessel, thereby creating a filled vessel. The filled vessel is re-positioned in registration with the conveyor, or turntable so that the dispenser becomes engaged with a subsequent empty receiving vessel.

Figure 6:
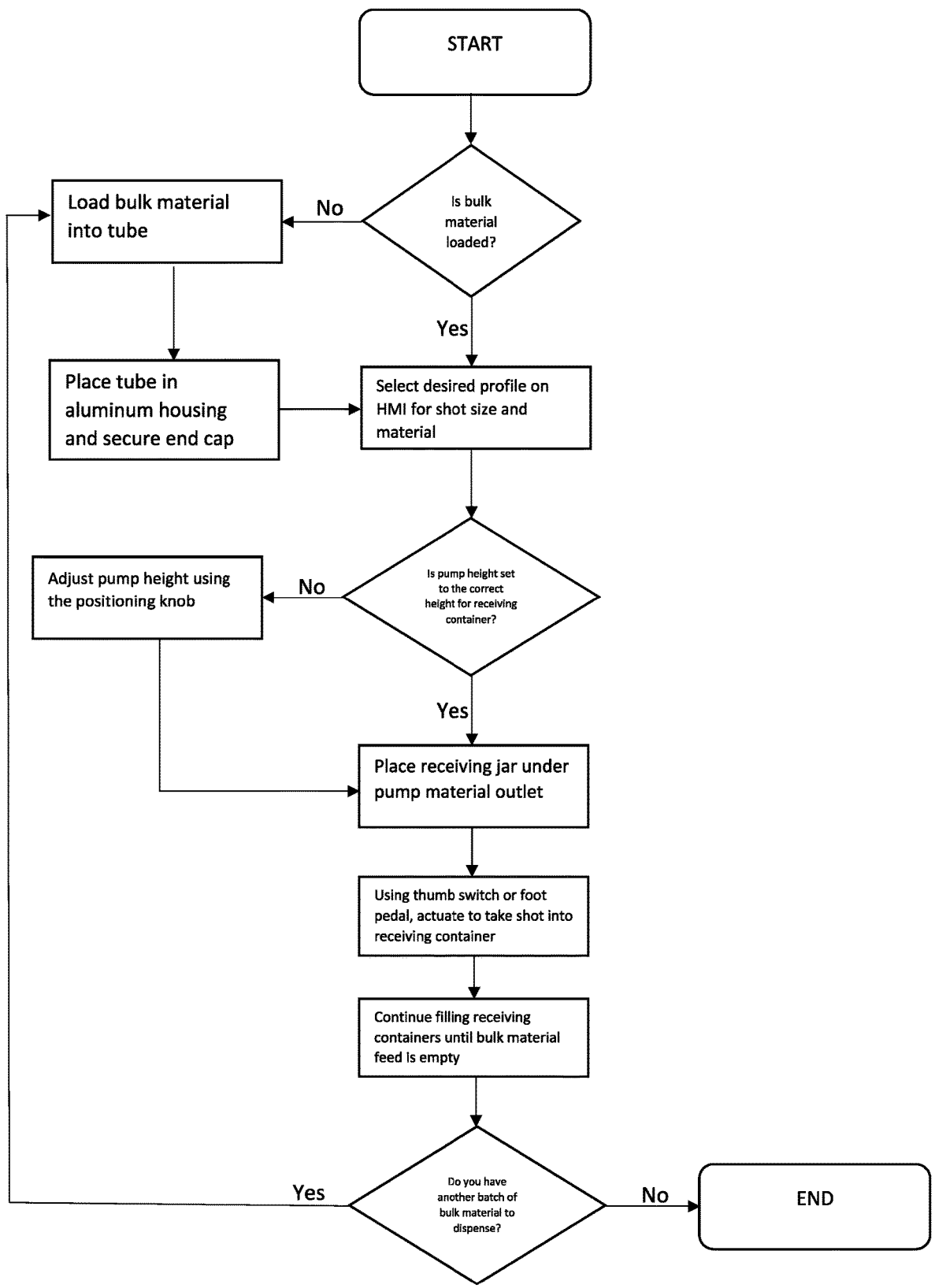
FIG. 6 is a flow diagram of various process steps according to one method variant.

One way to consider some appropriate method steps is depicted in FIG. 6.

System Componentry

Turning now to FIGS. 1-5, in one embodiment, the system includes a stand with a linear positioning slider sub-assembly 14 which supports a progressive cavity pump sub-assembly 10. One suitable pump is a Model 3VPHD12, made by Viscotec. See, www.viscotec.de/media/Pharma-dispenser-3VPHD12_EN.pdf, which is incorporated by reference. Such pumps ensure that the concentrate is separated from a dispensing nozzle cleanly in a controlled manner without dripping. Id. Dosing precision is +/−1% with a repeat accuracy >99%. Id.

The bulk material feed container 16 attaches directly to the pump 10 material inlet port 22. One suitable material feed system is Model CR570, made by Fisnar, See, www.ellsworth.com/search/?q=CR570&p=products, which is incorporated by reference. This product is a metal cartridge retainer assembly (preferably 20 oz).

A receiving container is manually located under pump 10 to receive a metered amount of material.

In an alternate embodiment, pump 10 is attached to a positioning robot. The robot is adapted to move the pump over the receiving container and send an electrical signal to the pump to dispense a desired amount of concentrate.

In another embodiment, pump 10 is located above a conveyor belt system. The conveyor system brings empty receiving containers under pump 10, which directly dispenses concentrate into the container.

Figure 5:
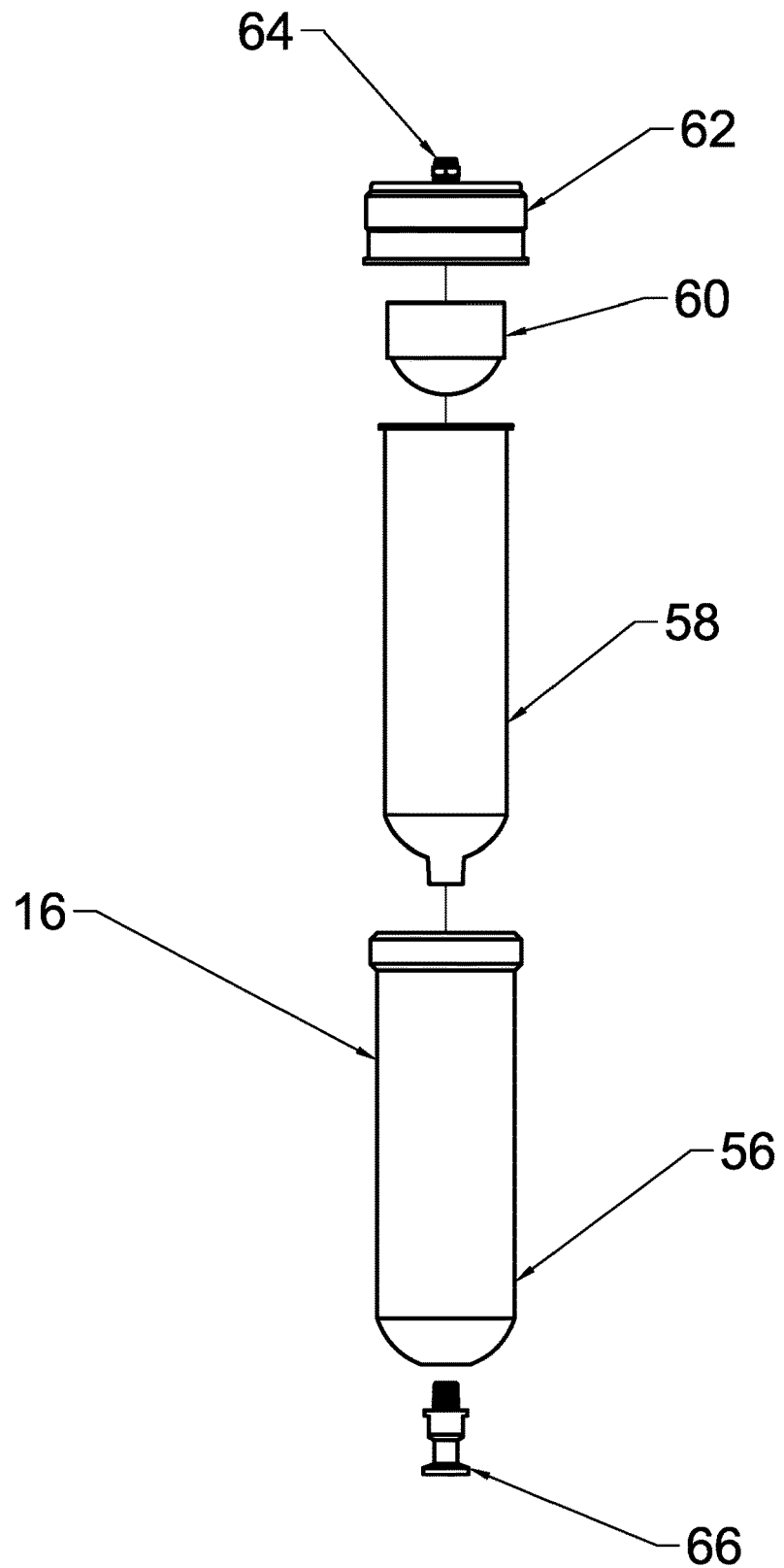
FIG. 5 is an exploded front view of a bulk feed container sub-assembly.

Bulk concentrate is loaded into plastic tubes 58 (FIG. 5). A plunger 60 is inserted after tube 58 is loaded. The tube 58 is then placed into an aluminum housing 56 and the end cap 62 is threadedly engaged. Using a sanitary thread adapter 66, the bulk material feed container sub-assembly 16 is attached to the material inlet port 22 of the pump sub-assembly 10.

Figure 4:
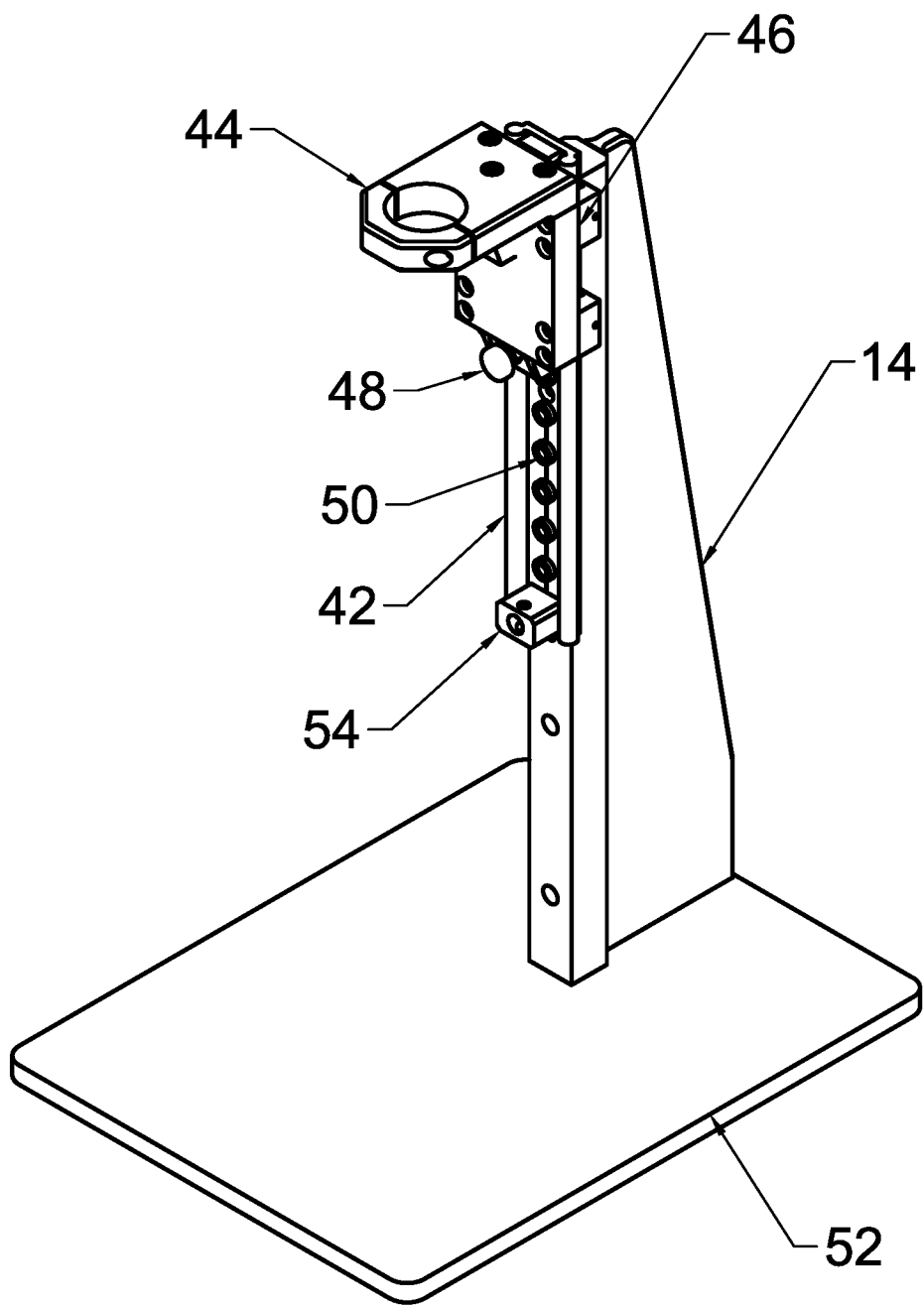
FIG. 4 is an isometric view of a linear positioning slider sub-assembly.

The pump sub-assembly 10 with the connected bulk material container 16 is attached to the stand with linear positioning slider sub-assembly 14 using a pump clamp sub-system 44 (FIG. 4).

The pump clamp sub-system 44 is rigidly mounted to a linear guide 46 which moves on the linear rail 42. The end stop 54 of the linear rail 54 prevents the linear guide 46 from traveling too far on the linear rail 42.

The positioning knob 48 is used to lock in the position of pump 10 by locating it inside a receiver for the positioning knob 50. There is an array of receivers 50 to allow pump 10 to be moved to different heights.

The servo motor 18 for pump 10 (FIG. 2) receives power from control 12 (FIG. 1) via a power cable attached to the power connection port 40 (FIG. 3) on control 12. The servo also receives digital data from control 12 wirelessly or via a data cable which is connected to control 12 at the communications port 38 on control 12.

The bulk material in the plastic tube 58 is forced into the material inlet port 22 of pump 10 by applying fluid (preferably gas-)pressure behind the plunger 60. The gas pressure is first cleaned using the pneumatic filter assembly 34 associated with the control 12. One suitable filter assembly is Model AW20K-N02E-2Z-B, made by SMC. See, www.smcusa.com/products/?id=167249&partNumber=aw20k-n02e-2z-b&type=Detail, which is incorporated by reference.

The control 12 sends an electric signal to the soft three-way valve 36, which allows gas pressure to enter the aluminum housing 56 through a pneumatic hose attached to a pneumatic fitting 64. One suitable valve is Model AV2000-N02-5DZ, made by SMC. See, www.smcusa.com/products/?id=158032&partNumber=AV2000-N02-5DZ&type=Detail, which is incorporated by reference.

Figure 1:
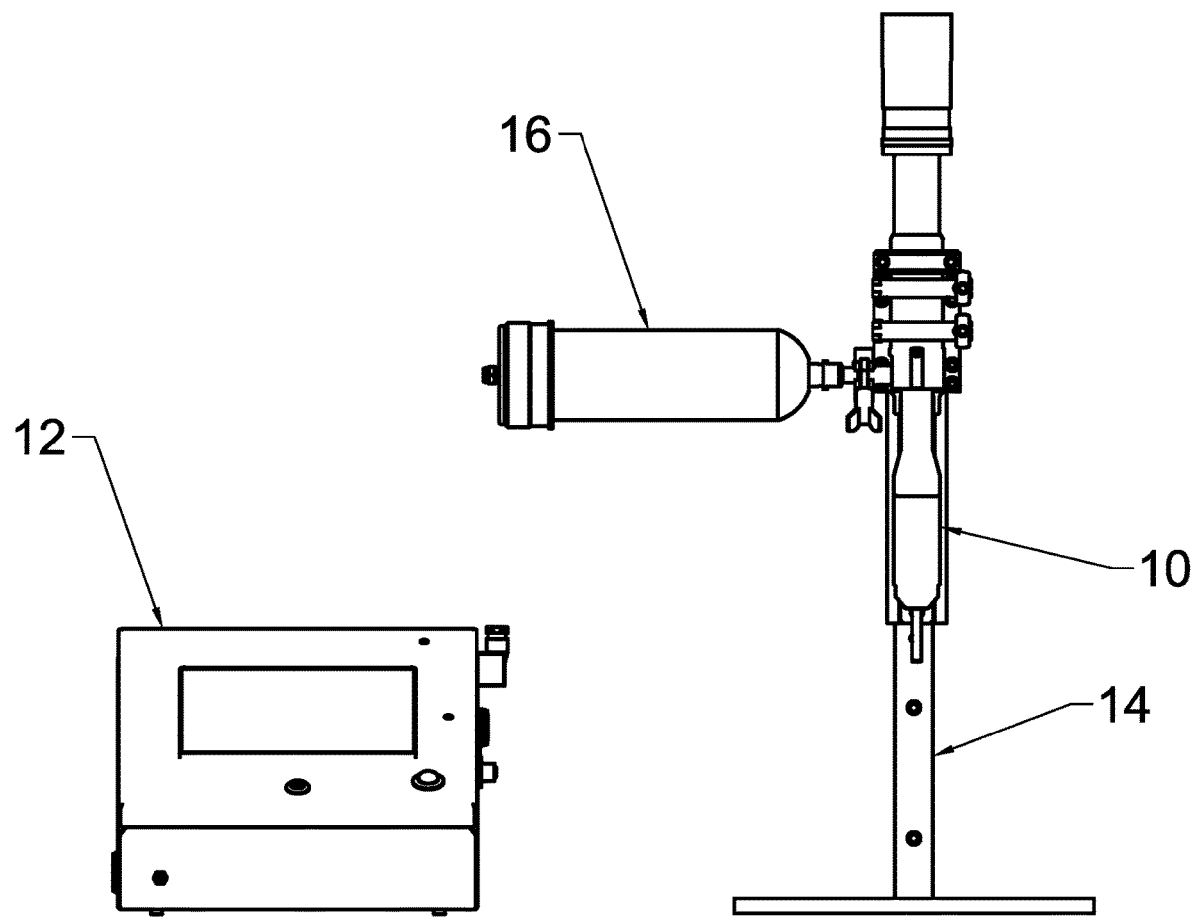
FIG. 1 is a front view of one embodiment of an assembly or system for transferring cannabis concentrate from a bulk material feed container to a jar in metered amounts with a progressive cavity pump using a system control.
Figure 2:
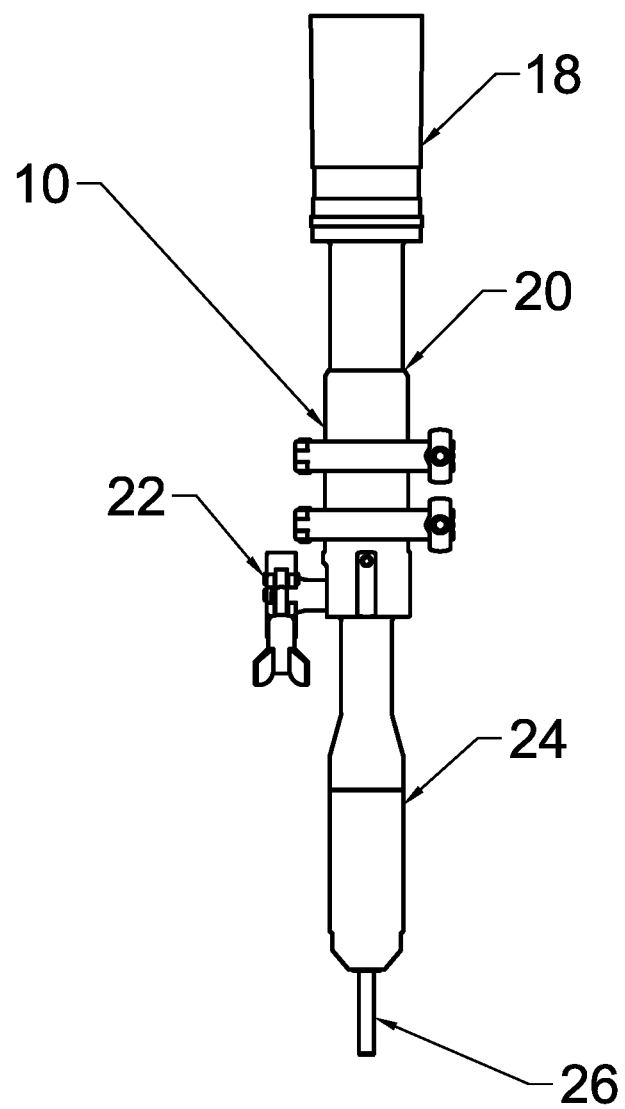
FIG. 2 is a front view of a progressive cavity pump sub-assembly.
Figure 3:
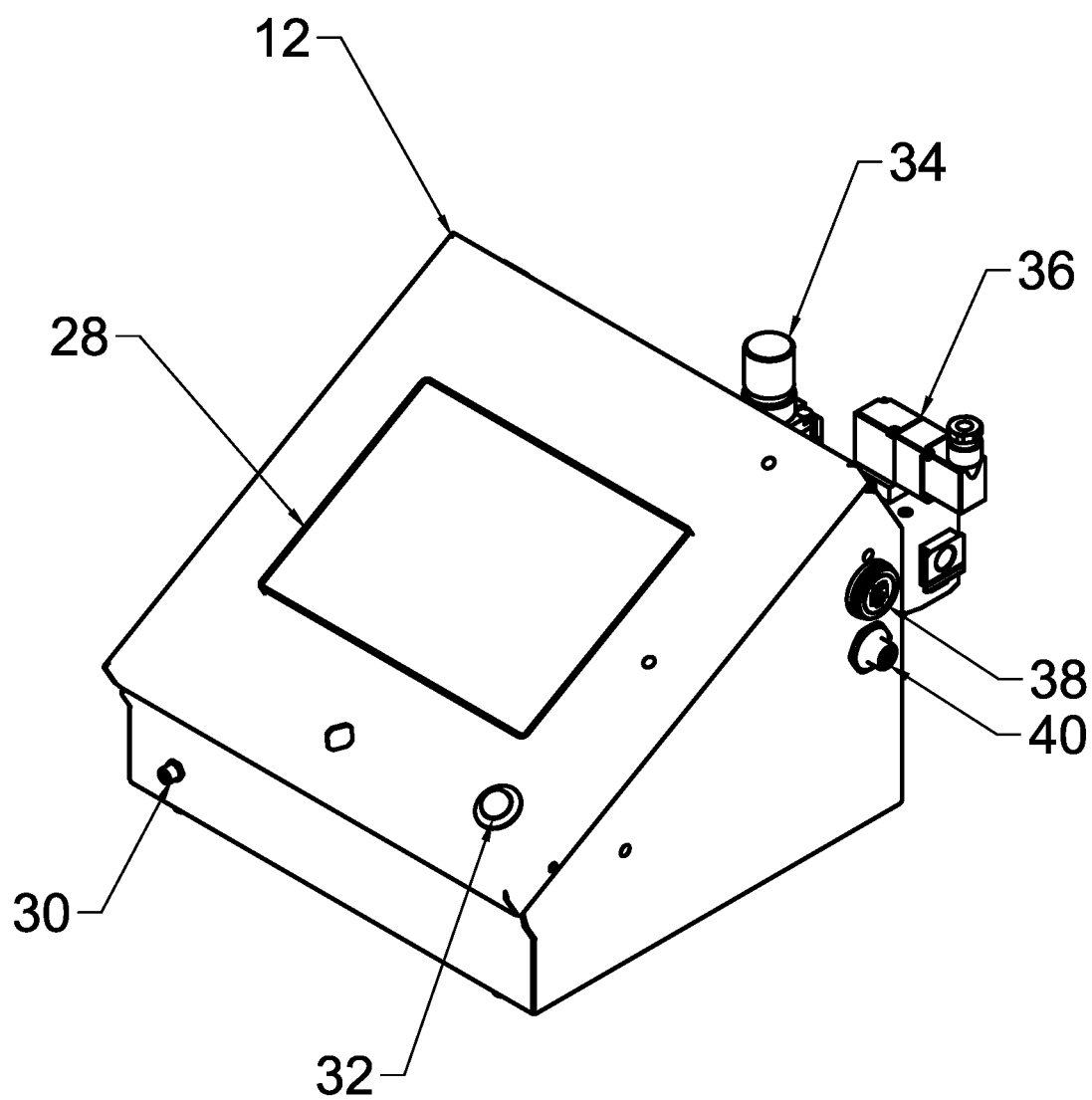
FIG. 3 is an isometric view of a system control sub-assembly.

After the bulk material has entered the material inlet port 22, pump 10 is ready to take metered shots of concentrate material. The material exits pump 10 through the material outlet port 26 (FIG. 2).

Control 12 commands the servo motor 18 to rotate at a desired speed and angle to determine the amount of material dispensed. The servo motor 18 rotates an eccentric rotor inside a stator, working on a progressive cavity principle, otherwise known as the endless piston principle. The eccentric rotor and stator are located in pump housing 24.

Control 12 commands a dispense cycle, in one embodiment, when a foot pedal or thumb switch is actuated. The foot pedal or thumb switch is connected to control 12 through an electrical connection port 30. The dispense cycle can also be actuated from a digital button on the HMI 28.

The control 12 preferably houses a human-machine interface ("HMI") with an integrated programmable logic controller ("PLC") 28. The HMI 28 can be used to build and store recipes which will be used for storing data for different material characteristics, including density. One suitable control is Model cMT3072XH, made by Weintek. See, dl.weintek.com/public/cMT/eng/Datasheet/cMT3072XH_Datasheet_ENG.pdf, which is incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

REFERENCE NUMERALS

| 10. | progressive cavity pump sub-assembly |
| --- | --- |
| 12. | system control sub-assembly |
| 14. | stand with linear positioning slider sub-assembly |
| 16. | bulk material feed container sub-assembly |
| 18. | servo motor |
| 20. | gear reduction adapter |
| 22. | material inlet port |
| 24. | pump housing containing the rotor and stator |
| 26. | material outlet port |
| 28. | human machine interface with integrated programmable logic controller |
| 30. | electrical connection for foot pedal or thumb switch |
| 32. | pressure indicator light |
| 34. | pneumatic filter assembly |
| 36. | soft start three way valve |
| 38. | communications port for servo motor |
| 40. | power connection port for servo motor |
| 42. | linear rail |
| 44. | pump clamp assembly |
| 46. | linear guides |
| 48. | positioning knob |
| 50. | receiver for positioning knob |
| 52. | base plate for linear positioning system |
| 54. | end stop for linear rail |
| 56. | aluminum housing for tubes |
| 58. | plastic tubes for bulk material |
| 60. | plunger for extruding material from the tube |
| 62. | end cap for aluminum housing |
| 64. | pneumatic fitting for aluminum housing |
| 66. | sanitary thread adapter for plastic tube |

We claim:

1. A method for dispensing metered shots of cannabis-containing or hemp-containing concentrate into a receiving vessel, the method comprising the steps of
   a. providing a control module that includes a touch screen, the control module being adapted to execute operations including
      i. receiving data that characterizes the concentrate, the data being selected from a group consisting of fluid viscosity, density, temperature, and desired mass of a shot size of the concentrate to be dispensed;
      ii. controlling process parameters based on the data, the process parameters being selected from a group consisting of revolution, time, and discharge rate that influence an endless piston pump or a progressive cavity pump;
   b. communicating the control module with the endless piston pump or progressive cavity pump;
   c. deploying a disposable tube and plunger to feed the endless piston pump or progressive cavity pump with bulk concentrate by loading bulk concentrate into the disposable tube and inserting the plunger after the tube is loaded and placing the concentrate into an aluminum housing before applying an end cap
   d. positioning an empty receiving vessel into a position in relation to the endless piston pump or progressive cavity pump using a positioning device, or manually placing the receiving vessel into position;
   e. dispensing a metered shot of the concentrate into the empty receiving vessel to prepare a filled vessel; and
   f. re-positioning the filled vessel in registration with the positioning device so that the dispenser becomes engaged with a subsequent empty receiving vessel.

2. The method of claim 1, wherein the positioning device is a conveyor or a turntable.

3. The method of claim 1, wherein the method is followed by the step of using a sanitary thread adapter to attach a bulk material feed container sub-assembly to a material inlet port of the endless piston pump or progressive cavity pump.

* * * * *